(12) United States Patent
Chiang et al.

(10) Patent No.: US 10,351,459 B2
(45) Date of Patent: *Jul. 16, 2019

(54) MOLDS AND METHODS TO CONTROL MOLD SURFACE QUALITY

(71) Applicant: CORNING INCORPORATED, Corning, NY (US)

(72) Inventors: Yi-Chun Chiang, New Taipei (TW); Jill Marie Hall, Campbell, NY (US); Shen Li, Shanghai (CN); Ljerka Ukrainczyk, Painted Post, NY (US); Hong Chih Wang, New Taipei (TW); Fang-Yu Hsu, Taichung (TW)

(73) Assignee: CORNING INCORPORATED, Corning, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/234,114

(22) Filed: Aug. 11, 2016

(65) Prior Publication Data

US 2017/0044045 A1 Feb. 16, 2017

Related U.S. Application Data

(60) Provisional application No. 62/205,111, filed on Aug. 14, 2015.

(51) Int. Cl.
*B24B 37/11* (2012.01)
*C03B 23/03* (2006.01)
(Continued)

(52) U.S. Cl.
CPC .............. *C03B 23/03* (2013.01); *B24B 1/00* (2013.01); *B24B 19/26* (2013.01); *B24B 37/00* (2013.01);
(Continued)

(58) Field of Classification Search
CPC ....... C03B 40/00; C03B 11/00; C03B 23/002; C03B 23/023; C03B 23/0252;
(Continued)

(56) References Cited

U.S. PATENT DOCUMENTS 1,575,122 A 3/1926 Madsen
4,110,095 A * 8/1978 Stengle, Jr. ............. C03B 40/02
508/107
(Continued)

FOREIGN PATENT DOCUMENTS

DE 132711 7/1902
JP H06211540 8/1994
(Continued)

OTHER PUBLICATIONS

International Search Report and Written Opinion PCT/US2016/046742 dated Mar. 10, 2017.
(Continued)

*Primary Examiner* — Nahida Sultana
(74) *Attorney, Agent, or Firm* — Timothy M. Schaeberle (57) ABSTRACT

A method for treating a mold includes grinding an outer metal surface of a mold body of the mold with a first material; lapping the outer metal surface after the grinding with a second material that is finer than the first material; and polishing the outer metal surface after the lapping to achieve an average surface roughness ($R_a$) less than or equal to about 0.15 µm and a waviness height ($W_a$) less than or equal to about 100 nm. A mold for shaping glass-based material can include a mold body having an outer metal surface, wherein the outer metal surface has an average surface roughness ($R_a$) less than or equal to about 0.15 µm and a waviness height ($W_a$) less than or equal to about 100 nm.

15 Claims, 7 Drawing Sheets

(51) Int. Cl.

| | |
|---|---|
| *C03C 3/091* | (2006.01) |
| *C22C 19/05* | (2006.01) |
| *C03C 3/095* | (2006.01) |
| *C03C 3/093* | (2006.01) |
| *B24B 37/00* | (2012.01) |
| *B24B 1/00* | (2006.01) |
| *C03B 11/08* | (2006.01) |
| *C23C 8/10* | (2006.01) |
| *B24B 19/26* | (2006.01) |
| *C23C 8/02* | (2006.01) |

(52) U.S. Cl.
CPC ............ *B24B 37/11* (2013.01); *C03B 11/084* (2013.01); *C03B 11/086* (2013.01); *C03C 3/091* (2013.01); *C03C 3/093* (2013.01); *C03C 3/095* (2013.01); *C22C 19/05* (2013.01); *C23C 8/02* (2013.01); *C23C 8/10* (2013.01); *C03B 2215/03* (2013.01); *C03B 2215/06* (2013.01); *C03B 2215/11* (2013.01); *C03B 2215/20* (2013.01); *Y02P 40/57* (2015.11)

(58) Field of Classification Search
CPC ............ C03B 23/0302; C03B 23/0355; C03B 23/0357; C03B 40/02; C03B 11/06–086; C03B 2215/03; C03B 11/086; C03B 23/0235; C03B 2215/32; C03B 2215/11; C03B 2215/20; C23C 8/10; C22F 1/10; C22C 19/03; Y02P 40/57
See application file for complete search history.

(56) References Cited

U.S. PATENT DOCUMENTS

| | | | |
|---|---|---|---|
| 4,483,700 A | 11/1984 | Forker, Jr. et al. | |
| 5,125,949 A * | 6/1992 | Hirota | C03B 11/086 106/38.28 |
| 5,306,339 A * | 4/1994 | Takeda | C03B 11/084 106/38.27 |
| 5,342,426 A | 8/1994 | Dumbaugh, Jr. | |
| 5,674,790 A | 10/1997 | Araujo | |
| 6,355,587 B1 * | 3/2002 | Loxley | C03B 19/06 264/653 |
| 6,502,423 B1 | 1/2003 | Ostendarp et al. | |
| 6,758,064 B1 | 7/2004 | Kariya | |
| 7,409,839 B2 | 8/2008 | Boratav et al. | |
| 7,666,511 B2 | 2/2010 | Ellison et al. | |
| 7,685,840 B2 | 3/2010 | Allaire et al. | |
| 7,770,414 B2 | 8/2010 | Cimo et al. | |
| 7,955,160 B2 | 6/2011 | Cobb et al. | |
| 8,158,543 B2 | 4/2012 | Dejneka et al. | |
| 8,210,001 B2 | 7/2012 | Allan et al. | |
| 8,586,492 B2 | 11/2013 | Barefoot et al. | |
| 8,701,443 B2 | 4/2014 | Bailey et al. | |
| 8,783,066 B2 | 7/2014 | Bailey et al. | |
| 8,802,581 B2 | 8/2014 | Dejneka et al. | |
| 8,969,226 B2 | 3/2015 | Dejneka et al. | |
| 2009/0305616 A1 | 12/2009 | Cobb et al. | |
| 2010/0010276 A1 | 1/2010 | Vogel et al. | |
| 2011/0023546 A1 | 2/2011 | Hayamizu et al. | |
| 2011/0162412 A1 | 7/2011 | Fukumoto et al. | |
| 2012/0135226 A1 | 5/2012 | Bookbinder et al. | |
| 2013/0004758 A1 | 1/2013 | Dejenka et al. | |
| 2013/0323444 A1 | 12/2013 | Ehemann et al. | |
| 2014/0202211 A1 | 7/2014 | Horn et al. | |
| 2015/0298363 A1 * | 10/2015 | Kamiyama | B29C 37/0053 65/66 |
| 2017/0137313 A1 * | 5/2017 | Bisson | C03B 11/06 |

FOREIGN PATENT DOCUMENTS

| | | |
|---|---|---|
| JP | H08133761 | 5/1996 |
| JP | 2003095666 | 4/2003 |
| WO | 2015087429 | 6/2015 |
| WO | 2016153885 A1 | 9/2016 |

OTHER PUBLICATIONS

Beaucamp et al; "Fluid Jet and Bonnet Polishing of Optical Moulds for Application From Visible to X-Ray"; Oprical Manufacturing and Testing IX, SPIE, vol. 8126, No. 1, Sep. 26, 2011; pp. 1-8.

Brinksmeier et al; "Surface Integrity Demands of High Precision Optical Molds and Realization by a New Process Chain"; Procedia Engineering, vol. 19, 2011; pp. 40-43.

Invitation to Pay Additional Fees; PCT/US2016/046742; dated Nov. 21, 2016; 11 Pages; European Patent Office.

Lambarri et al; "Laser Surface Smoothing of Nickel-Based Superalloys"; Physics Procedia, vol. 41, Apr. 9, 2013; pp. 255-265.

Moon, D.P., The reactive element effect on the growth rate of nickel oxide scales at high temperature, Oxidation of Metals Aug. 1989, vol. 32, Issue 1-2, pp. 47-66.

ASM Specialty Handbook: Nickel, Cobalt and Their Alloys, #06178G (ASM International 2000), 7 pages.

Huntz, A.M. Parabolic laws during high temperature oxidation: Relations with the grain size and thickness of the oxide. J.Mater. Sci, Lett., 18, 1981-1984 (1999).

Huntz, A.M., Lefevre, B. and Cassino, F. Roughness and Oxidation: Application to NiO growth on Ni at 800C. Mat. Sci. Eng. A, 290, 190-197 (2000).

Pandey, M C Decarburiza ion and internal oxidation in a commercial-grade nickel, Oxidation of Metals, 48 (1-2) 129-141 1997.

MetroPro Surface Texture Parameters Manual http://www.zygo.com/?/met/applications/surfacefinish/, 2 pages, downloaded Nov. 8, 2016.

F. Czerwinski, The growth and structure of thin oxide films on nickel superficially modified with ceria and cerium, Department of Mining and Metallurgical Engineering, McGill University, Montreal, Apr. 1997.

Stott, F H; Martinez-Villafane, A; Wood, G C. The Influence of Alloying Element on the Internal Oxidation of Nickel-Base Alloys Proceedings of the 9th International Congress on Metallic Corrosion, 1984 3:317-324.

A.M. Huntz, A. Lefeuvre, M. Andrieux Stress and oxidation of nickel according to its purity, Materials at High Temperatures 2003 20(4):639-648.

Molins, R., Andrieux,M., Huntz, A.M. Effect of impurities on the oxidation mechanism of nickel at 800° C., Materials at High Temperatures, 2005 22(3):335-342.

Haugsrud, R., On the high-temperature oxidation of nickel, N-0349, Department of Chemistry, Center for Materials Science, University of Oslo, Norway, Apr. 17, 2002.

* cited by examiner

Grain Boundary Height as Affected by
Pre-Oxidation Roughness

MOLDS AND METHODS TO CONTROL MOLD SURFACE QUALITY

CROSS-REFERENCE TO RELATED APPLICATIONS

This application claims the benefit of priority under 35 U.S.C. § 119 of U.S. Provisional Application Ser. No. 62/205,111 filed Aug. 14, 2015, the content of which is relied upon and incorporated herein by reference in its entirety.

BACKGROUND

Field

The present specification generally relates to molds and methods for controlling mold surface quality, more specifically, to molds for shaping glass-based materials.

Technical Background

The current demand in modern electronics devices for thin, three dimensional glass-based substrates that have very high levels of surface quality has produced a need to find processes that are commercially capable of providing defect-free shaped glass-based substrates. Shaped glass forming generally refers to high temperature processes that involve heating the glass to be formed to a temperature at which it can be manipulated, and then conforming it to a mold to achieve the designed shape. Classic methods of shaping glass substrates include television tube forming, where a softened glass gob is pressed between male & female molds, and bottle forming, where glass is blown in a pair of hollowed molds.

In shaping operations, the quality of the mold surface is important for producing cosmetically acceptable glass quality that can be polished into a final glass article with minimal polishing. Metal molds can have a surface texture that reproduces onto the glass surface during the molding process. This is undesirable and it can be difficult to remove the reproduced texture from the shaped glass with polishing. Thus a need exists to control the mold surface quality to minimize or reduce the possibility of a surface texture on the mold surface that reproduces onto the shaped glass-based substrate.

SUMMARY

The embodiments described herein relate to molds for shaping glass-based materials, methods for treating mold surfaces to control the quality of the mold surfaces. According to one embodiment, a method for treating a mold includes grinding an outer metal surface of a mold body of the mold with a first material; lapping the outer metal surface after the grinding with a second material that is finer than the first material; and polishing the outer metal surface after the lapping to achieve an average surface roughness ($R_a$) less than or equal to about 0.15 µm and a waviness height ($W_a$) less than or equal to about 100 nm. In some embodiments, the mold body may include at least 90% nickel by weight and at least one of titanium, aluminium, zirconium, silicon, manganese, or cerium, wherein a sum of a weight percent of titanium, aluminium, zirconium, silicon, manganese and cerium is in a range from about 0.6% to about 1%. In some embodiments, the mold body may include at least 99% nickel by weight.

In some embodiments, the first material may be an abrasive having a grit size in a range from about 600 to about 1200. In some embodiments, the second material may be an abrasive having a grit size in a range from about 800 to about 1500. In some embodiments, the polishing may include using a paste having particles with a mean particle size in a range from about 6 µm to about 14 µm. In some embodiments, one or more of the grinding, lapping, and polishing is performed in a random motion, for example a circular motion.

In some embodiments, the polishing achieves an average surface roughness ($R_a$) in a range from about 0.04 µm to about 0.15 µm, or from about 0.06 µm to about 0.1 µm. In some embodiments, the polishing achieves a waviness ($W_a$) less than or equal to 40 µm.

In some embodiments, the method may include comprising oxidizing the outer metal surface after polishing to produce a metal oxide layer, wherein the metal oxide layer has a surface roughness ($R_a$) less than about 1 µm and waviness ($W_a$) less than about 500 nm. In some embodiments, the metal oxide layer includes a plurality of grains and the plurality of grains has an average grain size of about 300 µm or less. In some embodiments, the metal oxide layer includes least one grain body area and at least one grain boundary area and wherein an average height differential between the at least one grain body area and the at least one grain boundary area is about 2 µm or less.

In some embodiments, the method may also include doping the outer metal surface at least one of titanium, aluminium, zirconium, silicon, manganese, or cerium after polishing or after polishing and prior to oxidizing.

According to another embodiment, a mold can include a mold body with an outer metal surface, wherein the outer metal surface has an average surface roughness ($R_a$) less than about 0.15 µm and a waviness height ($W_a$) less than about 100 nm. In some embodiments, the mold body may include at least 90% nickel by weight and at least one of titanium, aluminium, zirconium, silicon, manganese, or cerium, wherein a sum of a weight percent of titanium, aluminium, zirconium, silicon, manganese and cerium is in a range from about 0.6% to about 1%. In some embodiments, the mold body may include at least 99% nickel by weight. In some embodiments, the mold body has an average surface roughness ($R_a$) in a range from about 0.04 µm to about 0.15 µm, or from about 0.06 µm to about 0.1 µm. In some embodiments, the mold body has a waviness ($W_a$) less than or equal to 40 µm. In some embodiments, the moldy body has an average surface roughness ($R_a$) in a range from about 0.06 µm to about 0.1 µm and a waviness ($W_a$) less than or equal to 40 µm.

According to another embodiment, a mold can include a mold body having a metal surface; and a metal oxide layer on the metal surface of the mold body. The metal oxide layer may have first and second opposing surfaces. The first surface of the metal oxide layer may contact and face the metal surface of the mold body and the second surface of the metal oxide layer may include a plurality of grains. The plurality of grains may have an average grain size of about 300 µm or less. In some embodiments, the mold body may include at least 90% nickel by weight and at least one of titanium, aluminium, zirconium, silicon, manganese, or cerium, wherein a sum of a weight percent of titanium, aluminium, zirconium, silicon, manganese and cerium is in a range from about 0.6% to about 1%. In some embodiments, the mold body may be at least 99% nickel by weight. In some embodiments, the metal oxide layer may be nickel oxide.

In some embodiments, the second surface includes at least one grain body area and at least one grain boundary area and wherein an average height differential between the at least one grain body area and the at least one grain boundary area is about 2 µm or less or about 1 µm or less. In some embodiments, the average grain size is about 150 µm or less. In some embodiments, the second surface of the metal oxide layer has waviness (Wa) of less than or equal to about 500 nm or less than or equal to about 100 nm. In some embodiments, the second surface of the metal oxide layer has an average surface roughness (Ra) of about 1 µm or less, about 0.4 µm or less, or in a range from about 0.2 µm to about 0.4 µm. In some embodiments, the second surface of the metal oxide layer has a waviness (Wa) of less than or equal to about 500 nm and an average surface roughness (Ra) of about 1 µm or less. In some embodiments, the second surface of the metal oxide layer has a waviness (Wa) of less than or equal to about 500 nm and an average surface roughness (Ra) in a range from about 0.2 µm to about 0.4 µm. In some embodiments, a ratio of an $R_{volume}$ below the surface of the metal oxide layer divided by the $R_{volume}$ above the surface of the metal oxide layer is less than or equal to 2.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Reference will now be made in detail to various embodiments of molds for shaping glass-based materials and methods for controlling the mold surface quality, examples of which are illustrated in the accompanying drawings. Whenever possible, the same reference numerals will be used throughout the drawings to refer to the same or like parts. Embodiments of methods for controlling mold surface quality, as well as embodiments of molds for shaping glass-based materials, will be described in more detail herein with specific reference to the appended drawings.

The following description is provided as an enabling teaching. To this end, those skilled in the relevant art will recognize and appreciate that many changes can be made to the various embodiments described herein, while still obtaining the beneficial results. It will also be apparent that some of the desired benefits can be obtained by selecting some of the features without utilizing other features. Accordingly, those who work in the art will recognize that many modifications and adaptations to the present embodiments are possible and can even be desirable in certain circumstances and are a part of the present description. Thus, the following description is provided as illustrative and should not be construed as limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the meanings detailed herein.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise As used herein, the term "glass-based" includes glass and glass-ceramic materials.

As used herein, the term "substrate" describes a glass-based sheet that may be formed into a three-dimensional structure.

Generally, disclosed herein is a method for treating a mold to control the mold's surface quality and a mold for shaping glass-based material. Glass-based articles formed using the molds described herein may have a reduced number of defects. Ideally, the as-formed quality of a part is as good as the glass-based sheet from which it is formed. For the most economical process, one desires that this surface quality is achieved without further reworking or polishing of the as-formed surface. Defects, as used herein, include, but are not limited to, dimples (depressions in the glass-based surface), surface checks/cracks, blisters, chips, cords, dice, observable crystals, laps, seeds, stones, orange peel defects (imprint of large oxide grains on formed glass-based material, and pits in the formed glass-based material from raised areas on the mold surface, such as grain boundary areas, for example pits having 0.1 micron in height with a diameter greater than 30 microns), and stria. To that end, disclosed herein is a pre-oxidation mold without a metal oxide layer including a mold body with an outer metal surface, wherein the outer metal surface has a surface roughness (Ra) less than or equal to about 0.15 μm and a waviness (Wa) less than about 100 nm. In some embodiments, the mold body may include at least 90% nickel by weight and at least one of titanium, aluminium, zirconium, silicon, manganese, or cerium, wherein a sum of a weight percent of titanium, aluminium, zirconium, silicon, manganese and cerium is in a range from about 0.6% to about 1%. Also disclosed herein is a post-oxidation mold having a mold body having a metal surface; and a metal oxide layer on the metal surface of the mold body. The metal oxide layer may have first and second opposing surfaces. The first surface of the metal oxide layer may contact and face the metal surface of the mold body and the second surface of the metal oxide layer may include a plurality of grains. The plurality of grains may have an average grain size of about 300 μm or less. In some embodiments, the mold body may include at least 90% nickel by weight and at least one of titanium, aluminium, zirconium, silicon, manganese, or cerium, wherein a sum of a weight percent of titanium, aluminium, zirconium, silicon, manganese and cerium is in a range from about 0.6% to about 1%. In some embodiments, the metal oxide layer may be nickel oxide.

Embodiments herein include a method for modifying a mold surface which will be used in the formation of glass-based substrates, such as three-dimensional glass-based substrates. The glass-based substrates may be useful as front and/or back covers for electronics devices, such as telephones, electronic tablets, televisions etc. In these electronics applications, the shape and the surface quality of the glass-based substrate may need to be within very tight tolerances in order to provide not only aesthetic appeal, but also to minimize weaknesses in the surface of the glass-based material, potential electronics issues, and minimize costs.

Pre-Oxidation Mold Surface Treatments

Figure 1:
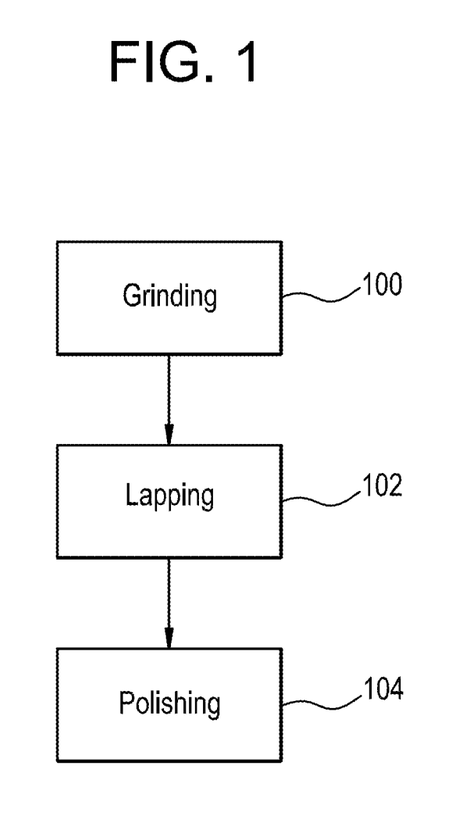
FIG. 1 is a flowchart of an exemplary process for modifying the surface of a mold pre-oxidation.

In some embodiments, as shown in the exemplary flowchart of FIG. 1, a process for modifying a mold surface can include a step 100 of grinding a mold surface, a step 102 of lapping the mold surface, and a step 104 of polishing the metal surface. A mold 110 polished according to the embodiments described herein can include a mold body 112 having an outer surface 114, as shown for example in FIG. 2. It should be understood that outer surface 114 of mold body 112 can have a wide variety of shapes to form varying three dimensionally shaped glass-based articles. Outer surface 114 of mold body 112 can initially be CNC machined or milled to obtain a desired shape. Molds for shaping a glass-based material often have a metal oxide layer formed on the outer surface of the mold body to prevent sticking of the glass-based material to the mold during shaping. The metal oxide layer is often formed by subjecting the outer surface of the mold body to an oxidation treatment. The grinding, lapping and polishing processes described herein are performed prior to forming a metal oxide on outer surface 114 of the mold 100.

Figure 2:
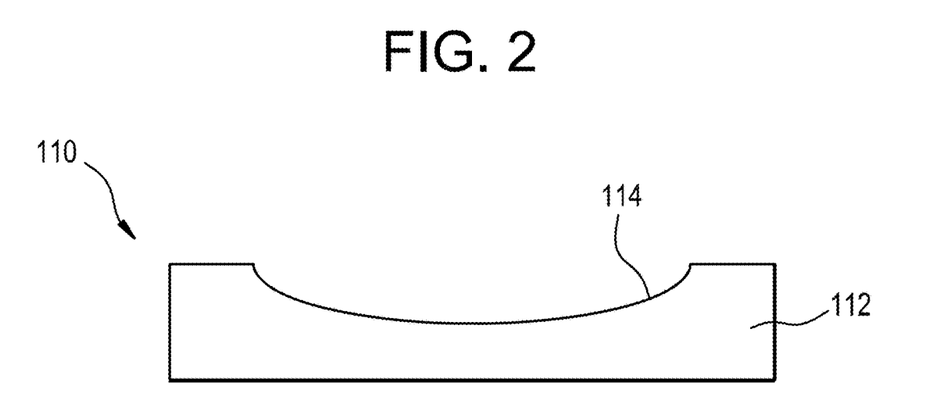
FIG. 2 schematically depicts the structure of a mold pre-oxidation for shaping glass, according to one or more embodiments shown and described herein.

In some embodiments, mold body 112 may be made of metal, for example nickel. In some embodiments, mold body 112 may be made of a bulk material of greater than about 90% nickel, or may comprise a layer forming outer surface 114 of at least about 90% nickel on another bulk material. In embodiments, where outer surface 114 is a layer formed on another bulk material, a thickness of the layer including outer surface 114 can be at least about 20 μm, at least about 30 μm, at least about 40 μm, or at least about 50 μm. In some embodiments, mold body 112 may have high purities of nickel, such as commercially-pure nickel, for formation of three-dimensional glass-based substrates. Nickel metals, as described below, may have excellent oxide layer properties, wherein they form a continuous native oxide layer that does not delaminate from the base metal and this oxide layer has excellent non-sticking characteristics when contacted by the softened glass-based material. Nickels may be relatively soft, and therefore have been thought to not be strong enough for conventional glass-based material forming operations. However, because the embodied processes do not apply heavy force on the mold 110, they allow for use of these materials in novel ways.

In some embodiments, the entire mold body 112 may comprise high purity nickel. In other embodiments, at least a portion of mold body 112 including outer surface 114 may comprise high purity nickel. High purity nickel makes it possible to form optical-quality glass-based articles. As used herein, a high purity nickel includes mold bodies having at least a surface with a composition comprising at least about 90%, about 93%, about 95%, about 97%, about 98%, about 99%, about 99.1%, about 99.2%, about 99.3%, about 99.4%, or about 99.5%, by weight nickel. In some embodiments, at least outer surface 114 of mold body 112 may comprise about 95% to about 99.5%, about 95% to about 99%, about 95% to about 98%, about 95% to about 97%, about 97% to about 99.5%, about 97% to about 99%, about 97% to about 98%, about 98% to about 99.5%, about 98% to about 99%, or about 99% to about 99.1%, about 99% to about 99.2%, about 99% to about 99.3%, about 99% to about 99.4%, or about 99% to about 99.5% by weight nickel.

Examples of nickel compositions that may be used herein include, but are not limited to, commercially pure nickel grades 200, 201, 205, 212, 222, and 233 (See. e.g., Special-Purpose Nickel Alloys, in ASM SPECIALTY HANDBOOK: NICKEL, COBALT AND THEIR ALLOYS, #06178G (ASM International 2000), herein incorporated by reference in its entirety).

In some embodiments, step 100 of grinding can include grinding outer surface 114 of mold body 112. As discussed above, the grinding, lapping and polishing processes described herein are performed prior to forming a metal oxide layer on outer surface 114 of mold 110. As such, step 100 includes grinding an outer metal surface 114 of mold body 112. In some embodiments, grinding can include, but is not limited to, manual grinding, wetblasting, CNC (computer numerical control) grinding, vibratory grinding, or sandblasting. Grinding can remove or decrease tool marks left on outer metal surface 114 when mold body 112 is formed (e.g., from CNC machining or milling). In some embodiments, the grinding material can be an abrasive material including, but not limited to alumina, diamond, silicon carbide and silica. In some embodiments, depending upon the method of grinding, the abrasive material can be in the form of a paper or in the form of a slurry having the abrasive material in the form of particles. In some embodiments, when a paper is used, the paper can have a grit size in a range from about 600 to about 1200 using the ISP/FEPA Grit Designation. In other embodiments, when a slurry is used, the abrasive particles may have a size in a range from about 3 µm to about 21 µm and the slurry media may be, for example, deionized water.

In some embodiments, step 102 of lapping may include lapping outer surface 114 of mold body 112 after step 100 of grinding. In some embodiments, lapping may include, but is not limited to manual lapping, wetblasting, CNC (computer numerical control) lapping, vibratory lapping, or sandblasting. Lapping may remove or decrease grinding marks left from step 100 of grinding outer metal surface 114 of mold body 112 and, in some embodiments, this may be accomplished using an abrasive material with a finer size than in step 100 of grinding. In some embodiments, the abrasive material may include, but is not limited to alumina, diamond, silicon carbide and silica. In some embodiments, the lapping material may be an abrasive material in the form of a paper, for example a paper having a grit size in a range from about 800 to about 1500 using the ISP/FEPA Grit Designation. In other embodiments, the lapping material may be a slurry having an abrasive material in the form of particles in a slurry, for example, the abrasive particles may have a size in a range from 3 µm to about 21 µm and the slurry media can be deionized water.

In some embodiments, step 104 of polishing may include polishing outer surface 114 of mold body 112 after step 102 of lapping. In some embodiments, polishing may include, but is not limited to manual polishing, wetblasting, CNC (computer numerical control) polishing, vibratory polishing, or sandblasting. Polishing may remove or decrease lapping marks left from step 102 of lapping outer metal surface 114 of mold body 112 and, in some embodiments, this may be accomplished using an abrasive material with a finer size than in step 102 of lapping. In some embodiments, the abrasive material may include, but is not limited to alumina, diamond, silicon carbide and silica. In some embodiments, the lapping material may be a paste including the abrasive material in the form of particles, for example a paste having a mean particle size in a range from about 6 µm to about 14 µm. In some embodiments, the paste can have a mean particle size of about 6 µm, about 7 µm, about 8 µm, about 9 µm, about 10 µm, about 11 µm, about 12 µm, about 13 µm, or about 14 µm.

In some embodiments, one or more of step 100 of grinding, step 102 of lapping, and step 104 of polishing can be performed in a non-linear motion, for example in a circular motion. Polishing in a linear motion can result in pronounced, distinct grains on outer metal surface 114, which can ultimately be transferred to the glass-based material as defects during molding; whereas polishing in a non-linear motion can result in indistinct grains on outer metal surface 114.

In some embodiments, outer metal surface 114 can be cleaned prior to one or more of step 100 of grinding, step 102 of lapping, and step 104 of polishing. In some embodiments, the cleaning can include one or more of rinsing outer metal surface 114, for example with deionized water, and ultrasonic cleaning.

In some embodiments, outer metal surface 114 can be inspected after one or more of step 100 of grinding, step 102 of lapping, and step 104 of polishing to determine if additional grinding, lapping, or polishing is needed.

Mold Qualities Post-Polishing and Pre-Oxidation

In some embodiments, after the step 104 of polishing and prior to the formation of a metal oxide layer on outer metal surface 114, outer metal surface 114 may have "pre-oxidation" attributes. In some embodiments, pre-oxidation outer metal surface 114 may have a waviness, $W_a$, which describes the average peak-to-valley height of the surface waviness profile of outer metal surface 114. In some embodiments, the $W_a$ is from about 1 nm to about 100 nm over an evaluation length of 1 cm. In some embodiments, the $W_a$ is less than or equal to about 1 nm, 2 nm, 5 nm, 10 nm, 20 nm, 40 nm, 60 nm, 80 nm, or 100 nm over an evaluation length of 1 cm. The $W_a$ can be measured using a confocal microscope, such as one available from Zeiss, or an optical profilometer, such as one available from Zygo.

In some embodiments, pre-oxidation outer metal surface 114 may have an average surface roughness ($R_a$) in a range from about 0.03 µm to about 0.15 µm, about 0.03 µm to about 0.14 µm, about 0.03 µm to about 0.13 µm, about 0.03 µm to about 0.12 µm, about 0.03 µm to about 0.11 µm, about 0.03 µm to about 0.1 µm, about 0.03 µm to about 0.09 µm, about 0.03 µm to about 0.08 µm, about 0.03 µm to about 0.07 µm, about 0.03 µm to about 0.06 µm, about 0.03 µm to about 0.05 µm, about 0.03 µm to about 0.04 µm, about 0.04 µm to about 0.15 µm, about 0.04 µm to about 0.14 µm, about 0.04 µm to about 0.13 µm, about 0.04 µm to about 0.12 µm, about 0.04 µm to about 0.11 µm, about 0.04 µm to about 0.1 µm, about 0.04 µm to about 0.09 µm, about 0.04 µm to about 0.08 µm, about 0.04 µm to about 0.07 µm, about 0.04 µm to about 0.06 µm, about 0.04 µm to about 0.05 µm, about 0.05 µm to about 0.15 µm, about 0.05 µm to about 0.14 µm, about 0.05 µm to about 0.13 µm, about 0.05 µm to about 0.12 µm, about 0.05 µm to about 0.11 µm, about 0.05 µm to about 0.1 µm, about 0.05 µm to about 0.09 µm, about 0.05 µm to about 0.08 µm, about 0.05 µm to about 0.07 µm, about 0.05 µm to about 0.06 µm, about 0.06 µm to about 0.15 µm, about 0.06 µm to about 0.14 µm, about 0.06 µm to about 0.13 µm, about 0.06 µm to about 0.12 µm, about 0.06 µm to about 0.11 µm, about 0.06 µm to about 0.1 µm, about 0.06 µm to about 0.09 µm, about 0.06 µm to about 0.08 µm, about 0.06 µm to about 0.07 µm, about 0.08 µm to about 0.15 µm, about 0.08 µm to about 0.14 µm, about 0.08 µm to about 0.13 µm, about 0.08 µm to about 0.12 µm, about 0.08 µm to about 0.11 µm, about 0.08 µm to about 0.1 µm, about 0.08 µm to about 0.09 µm, about 0.09 µm to about 0.15 µm, about 0.09 µm to about 0.14 µm, about 0.09 µm to about 0.13 µm, about 0.09 µm to about 0.12 µm, about 0.09 µm to about 0.11 µm, about 0.09 µm to about 0.1 µm, about 0.1 µm to about 0.15 µm, about 0.1 µm to about 0.14 pin, about 0.1 µm to about 0.13 µm, about 0.1 µm to about 0.12 µm, about 0.1 µm to about 0.11 µm, about 0.11 µm to about 0.15 µm, about 0.11 µm to about 0.14 µm, about 0.11 µm to about 0.13 µm, about 0.11 µm to about 0.12 µm, about 0.12 µm to about 0.15 µm, about 0.12 µm to about 0.14 µm, about 0.12 µm to about 0.13 µm, about 0.13 µm to about 0.15 µm, or about 0.14 µm to about 0.15 µm. In some embodiments, the average surface roughness ($R_a$) of pre-oxidation outer metal surface 114 may less than or equal to about 0.15 µm, 0.14 µm, 0.13 µm, 0.12 µm, 0.11 µm, 0.1 µm, 0.09 µm, 0.08 µm, 0.07 µm, 0.06 µm, 0.05 µm, 0.04 µm, or about 0.03 µm In some embodiments, this average surface roughness ($R_a$) is determined over an evaluation length, such as 100 µm, 10 mm, 100 mm, etc. or may be determined based on an analysis of the entire surface 114. As used herein, $R_a$ is measured over a 260 µm×350 µm sized area and defined as the arithmetic average of the differences between the local surface heights and the average surface height and can be described by the following equation:

$$R_a = \frac{1}{n}\sum_{i=1}^{n} |y_i|,$$

where $y_i$ is the local surface height relative to the average surface height. The $R_a$ can be measured using a confocal microscope, such as one available from Zeiss, or an optical profilometer, such as one available from Zygo. Pre-oxidation outer metal surface 114 having an average surface roughness ($R_a$) in the above ranges provides a matte finish. Thus in some embodiments, polishing step 104 is performed to achieve a matte finish rather than a mirror finish (e.g., an average surface roughness ($R_a$) of less than about 0.03 µm) because a metal oxide layer formed on a matte finish has a smaller grain size and less distinct grain boundaries than a metal oxide layer formed on a mirror finish, thereby resulting in less defects on glass-based material molded against a metal oxide layer of a mold.

In some embodiments, pre-oxidation outer metal surface 114 may have no directional lay. Thus, in some embodiments, pre-oxidation metal surface 114 may have a random surface without a preferential direction. Whether a surface has a directional lay (e.g., vertical, horizontal, radial, cross-hatched, circular, isotropic, etc.) may be determined by visual inspection. In some embodiments, pre-oxidation outer metal surface 114 may have a randomized polycrystalline orientation as measured using X-ray diffraction. In some embodiments, pre-oxidation outer metal surface 114 may have a distortion slope of less than or equal to about $2\times10^{-4}$. The distortion slope is a measurement of distortion or deviation of a mold surface from the CAD mold drawing of the desired surface. The distortion slope can be determined by measuring the slope of the deviation of the surface in the z direction over the width of a defect. The width can be the point where the distortion deviates from the CAD drawing to the peak depth or height of the distortion area. A stylus or optical profilometer such as a Zeiss 2000SD or Zygo 7300 can be used to measure the distortion slope.

The pre-oxidation attributes of outer metal layer 114 discussed above may result from one or more of step 100 of grinding, step 102 of lapping, and step 104 of polishing. The pre-oxidation attributes of outer metal layer 114 may affect the attributes of the mold after oxidation. For example, as discussed above, the average surface roughness ($R_a$) may affect whether the outer metal layer 114 has a matte finish or surface finish, which in turn may affect the size and distinctness of grains in a metal oxide layer formed on outer metal layer 114. Also, as discussed above, the motion of step 104 of polishing (linear vs. non-linear) may affect the distinctness of grains on outer metal surface 114.

Oxidation

Figure 3:
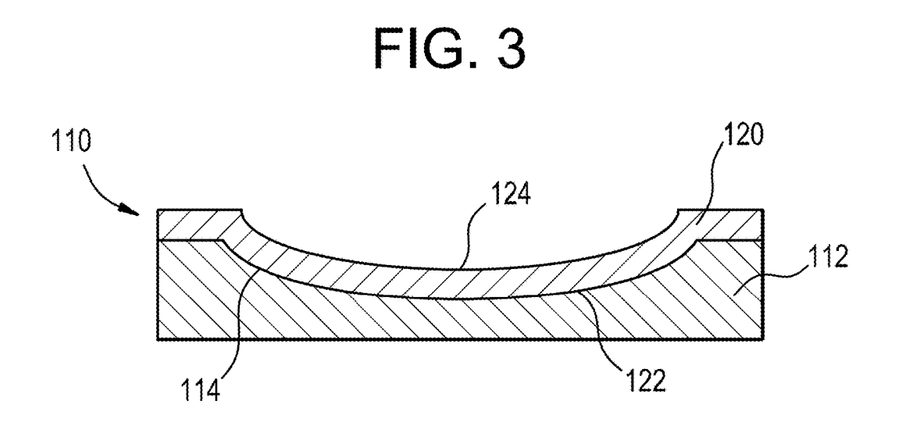
FIG. 3 schematically depicts the structure of a mold post-oxidation for shaping glass, according to one or more embodiments shown and described herein.

In some embodiments, a metal oxide layer 120 may be formed on mold body 110 by exposing surface 114 of mold body 110 to an oxidizing heat treatment. FIG. 3 shows an exemplary mold 100 having a metal oxide layer 120 having a first surface 122 adjacent metal surface 114 and an opposing second surface 124 which because the outer surface of mold 110. The metal of the metal oxide layer is the metal of the mold. For example, when mold 100 is predominantly nickel, metal oxide layer 120 will be a nickel oxide layer. The oxidizing heat treatment may include exposing the mold 100 to elevated temperatures sufficient to convert at least a portion of the metal, for example nickel, at surface 114 of mold body 112. An exemplary oxidizing heat treatment can include that disclosed in Pub. No. US 2014-0202211 A1, which is hereby incorporated by reference in its entirety.

Metal oxide layer 120 formed on surface 114 of mold body 112 may have an average thickness of from about 500 nm to about 20 micron, about 1 micron to about 14 micron, about 1 micron to about 10 micron, about 1 micron to about 8 micron, about 1 micron to about 6 micron, about 1 micron to about 4 micron, about 4 micron to about 20 micron, about 4 micron to about 14 micron, about 4 micron to about 10 micron, about 4 micron to about 8 micron, about 4 micron to about 6 micron, about 6 micron to about 20 micron, about 6 micron to about 14 micron, about 6 micron to about 10 micron, about 6 micron to about 8 micron, about 8 micron to about 20 micron, about 8 micron to about 14 micron, or about 8 micron to about 10 micron. In some embodiments, the nickel oxide layer 120 on the mold 110 may have an average thickness of about 100 nm or less, about 200 nm or less, about 300 nm or less, about 400 nm or less, about 500 nm or less, about 750 nm or less, about 1 micron or less, about 2 micron or less, about 3 micron or less, about 4 micron or less, about 5 micron or less, about 6 micron or less, about 7 micron or less, about 8 micron or less, about 9 micron or less, about 10 micron or less, about 12 micron or less, about 15 micron or less, about 18 micron or less, or about 20 micron or less.

Mold Quality Post-Oxidation

In some embodiments, mold 110 may include grains and the grains can grow during the oxidizing heat treatment. As shown for example in FIG. 4, the presence of grains can form two types of areas on the surface of mold 110—a grain body area 132 and a grain boundary area 134 on a surface of mold 110. During formation of nickel oxide layer 120, the nickel oxide can form faster on grain boundary areas 134 than on grain body areas 132. As a result, areas of surface 124 corresponding to grain boundary areas 134 will be raised relative to areas of surface 124 corresponding to grain body areas 132. During shaping of glass-based materials, the glass-based materials will contact the raised grain boundary areas 134 of mold 110 first when being shaped, potentially causing the pattern of the grain boundary areas 134 to be imprinted on the surface of the glass-based material depending upon the size of grain boundary areas 134. It has been found that reducing the size of the grain bodies, increases the percentage of the grain boundary areas 134 on surface 124. Increasing the area of the grain boundary areas 134 results in lower localized pressure at the glass-based material/grain boundary interface during shaping. The lower the localized pressure, the less likely a grain boundary impression will be seen on the shaped glass-based material. It has also been found that reducing the height differential between grain body areas 132 and grain boundary areas 134 can also minimize the likelihood that a grain boundary impression will be seen on the shaped glass-based material. A controlled amount of impurities in the mold, for example, titanium, aluminum, zirconium, silicon, manganese, and cerium, segregate at the grain boundaries to minimize or prevent grain growth by pinning the grain boundaries. The impurities also slow down the diffusion of nickel through the grain boundary areas to form the oxide layer and in turn that slows the formation of the nickel oxide layer at the grain boundary areas, thereby minimizing the grain boundary height differential. The impurities pinning down the grain boundaries can also minimize or prevent growth of very large grains which can produce orange peel imprints on glass shaped with the mold that cannot be removed by polishing the glass. It has also been found that performing one or more of step 100 of grinding, step 102 of lapping, and step 104 of polishing prior to forming a metal oxide layer on mold 110 can minimize the height differential and can produce small oxide grain size which does not impart orange peel on glass-based material shaped with the mold.

Figure 4:
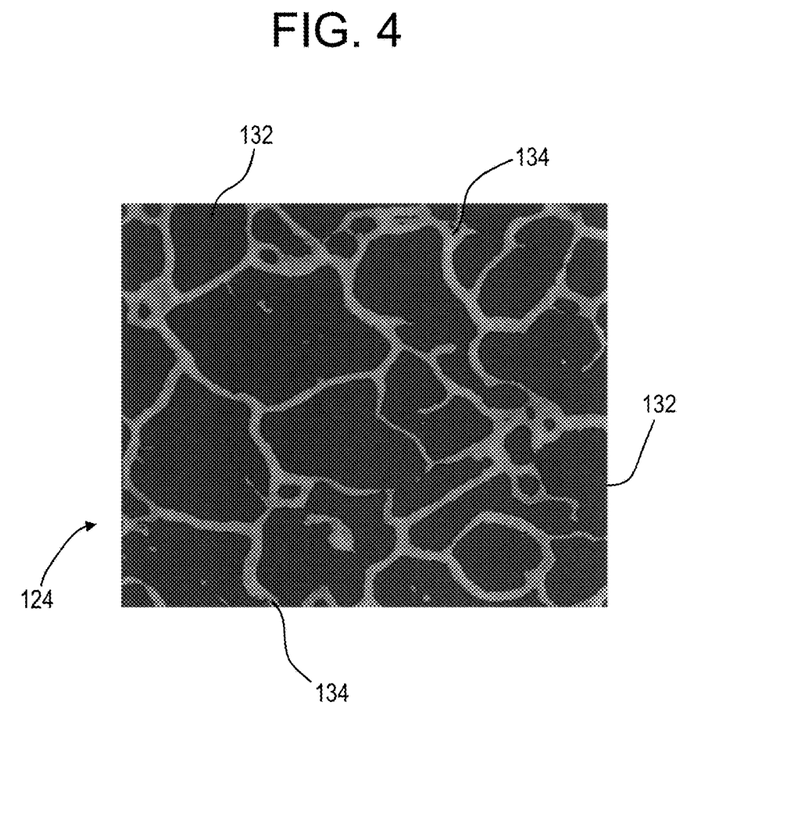
FIG. 4 is a view of an exemplary nickel oxide layer surface taken with a confocal microscope.

In some embodiments, minimizing the impact of grain boundary impressions on glass-based materials shaped on mold 100 can be achieved by controlling the average grain size and/or an average height differential between the grain body areas and the grain boundary areas on surface 124 of metal oxide layer 120. In some embodiments, the average grain size making up each grain body area 132 on surface 124 can be about 300 μm or less, about 275 μm or less, about 250 μm or less, about 225 μm or less, about 200 μm or less, about 175 μm or less, about 150 μm or less, about 145 μm or less, about 140 μm or less, about 135 μm or less, about 130 μm or less, about 125 μm or less, about 120 μm or less, about 115 μm or less, about 110 μm or less, about 105 μm or less, about 100 μm or less, about 95 μm or less, about 90 μm or less, about 85 μm or less, about 80 μm or less, about 75 lam or less, about 70 lam or less, about 65 μm or less, about 60 μm or less, about 55 μm or less, about 50 μm, about 45 μm or less, about 40 μm or less, about 35 μm or less, or about 30 μm or less. The average grain size can be determined by measuring the diameter of each grain at its widest point over a field of view and calculating the average value. The average grain size can be determined using image analysis software, such as Nikon Elements. The magnification can be 100× and the field of view can be 1 mm by 1 mm. The average grain size can be calculated based on 3 fields of view. In some embodiments, the average size of the grains making up each grain body area 132 on surface 124 of metal oxide layer 120 can be about 4 or above, about 4.5 or above, about 5 or above, about 5.5 or above, about 6 or above, about 6.5 or above, or about 7 or above as measured using ASTM E112-13 and its progeny. The larger the value for ASTM E112-13, the smaller the average grain size. The benefits of a smaller grain size are discussed above.

In some embodiments, the average height differential between grain body areas 132 and grain boundary areas 134 on surface 124 of metal oxide layer 120 can be about 2 μm or less, 1.75 μm or less, about 1.5 μm or less, about 1.25 μm or less, about 1 μm or less, about 0.75 μm or less, about 0.5 μm or less, or about 0.25 μm or less. In some embodiments, the average height differential can be measured by determining the average peak surface roughness ($R_p$) on surface 124 of metal oxide layer 120. In some embodiments, this average surface roughness ($R_p$) is determined over an evaluation length, such as 100 μm, 10 mm, 100 mm, 1 cm, etc. As used herein, $R_p$ is defined as the difference between the maximum height and the average height and can be described by the following equation:

$$R_p = \max_i y_i,$$

where $y_i$ is the maximum height relative to the average surface height. The $R_p$ can be measured using a confocal microscope, such as one available from Zeiss, or an optical profilometer, such as one available from Zygo.

In some embodiments, the average grain size and/or height differential between the grain body areas and grain boundary areas can be controlled by controlling the amount of manganese, silicon, titanium, aluminum, zirconium, and/or cerium in mold body 112 as a whole or in a region near surface 114. In some embodiments, mold body 110 can include a combination of one or more of manganese, silicon, titanium, aluminum, zirconium, and cerium such that the sum of the weight % of these elements is in a range from about 0.6% to about 1%. In some embodiments, the amount of manganese, silicon, titanium, aluminum, zirconium, and/or cerium in mold body 112 can be controlled by mixing oxides containing one or more of these elements in a desired amount in the slag used to form the bulk material, which is then used to form mold body 112. In some embodiments, outer metal surface 114 can be doped with one or more of manganese, silicon, titanium, aluminum, zirconium, and cerium after step 104 of polishing and prior to forming oxide layer 120. Doping can increase the weight percentage of the trace element from about 0.02% to about 0.3%. The doping can be performed, for example, by washing outer metal surface 114 with a salt solution containing one or more of manganese, silicon, titanium, aluminum, zirconium, and cerium. In some embodiments, the salt can be, but is not limited to, a carbonate, ammonium carbonate, or nitrate of one or more of manganese, silicon, titanium, aluminum, zirconium, and cerium. In other embodiments, doping can be achieved by polishing outer metal surface 114 with particles containing one or more of manganese, silicon, titanium, aluminum, zirconium, and cerium so that the particles become embedded in outer metal surface 114. In some embodiments, other conventional methods for doping can be used, including, but not limited to, evaporation and chemical vapor deposition. In some embodiments, if doping is achieved by washing, the washing step can be followed with a heat treatment step to encourage diffusion into the outer metal surface 114. In some embodiments, when cerium or zirconium is doped, the orientation of the grain boundary growth can be reversed or inverted such that there are no raised grain boundaries.

As described above, in some embodiments, the sum of manganese, silicon, titanium, aluminum, zirconium, and cerium in mold body 112 as a whole or in a region near surface 114 can be controlled. In such embodiments, at least a portion of mold body 112 near surface 114, which may include the entirety of mold body 112, the sum of manganese, silicon, titanium, aluminum, zirconium, and cerium in weight percent, may include, from about 0.6% to about 01%. In embodiments, where only a region near surface 112 has a sum of manganese, silicon, titanium, aluminum, zirconium, and cerium in the recited ranges, the portion of mold body 110 having the sum of manganese, silicon, titanium, aluminum, zirconium, and cerium in the recited ranges can extend about 20 μm or less, about 15 μm or less, about 10 μm or less, or about 5 μm or less from surface 112. The sum of manganese, silicon, titanium, aluminum, zirconium, and/or cerium within the ranges listed above segregate into grain boundaries to pin down the grain growth, thereby inhibiting the growth of grains in the nickel.

The glass-based articles formed using the molds 100 with metal oxide layers 120 described herein may have a reduced number of defects. Ideally, the as formed quality of the part would be as good as the glass-based sheet from which it is formed. For the most economical process, one desires that this surface quality is achieved without further rework or polishing of the as formed surface. Defects, as used herein, include, but are not limited to, dimples (depressions in the glass-based surface), surface checks/cracks, blisters, chips, cords, dice, observable crystals, laps, seeds, stones, orange peel defects (imprint of large oxide grains on the formed glass-based material and pits in the formed glass-based material from raised areas on the mold surface, such as grain boundary areas, for example pits having 0.5 micron in height with a diameter greater than 30 microns), and stria. In some embodiments, there are less than an average of 50, 40, 30, 20, 10, 5, 4, 3, 2, or 1 defects that are observable by the unaided human eye at 1000 lux in a 25 mm×25 mm area on any of the surfaces. In some embodiments, there are less than an average of 50, 40, 30, 20, 10, 5, 4, 3, 2, or 1 defects that are 150 micron in the largest dimension in a 25 mm×25 mm area on any of the surfaces, as measured by optical microscopy. In some embodiments, the defect is 1, 2, 3, 5, 10, 20, 30, 40, 50, 60, 70, 80, 90, 100, 125, or 150 micron in the largest dimension.

In another embodiment, glass-based articles formed using molds 100 with metal oxide layers 120 described herein may be essentially flawless. By "essentially flawless," it is meant that there are no indentations (or dimples) larger than 150 micron in diameter, as measured by an optical microscopy technique, in the surfaces. In some embodiments, there are less than an average of 50, 40, 30, 20, 10, 5, 4, 3, 2, or 1 indentations (or dimples) larger than 150 micron in diameter in the largest dimension in an 25 mm×25 mm area on any of the surfaces, as measured by optical microscopy. In some embodiments, the dimple size is larger than 1, 2, 3, 5, 10, 20, 30, 40, 50, 60, 70, 80, 90, 100, 125, or 150 micron in the largest dimension.

Without intending to be held to a particular theory, it is believed that the decrease in the level of defects on the as formed glass-based surface with nickel molds 100 is due to at least three causes. First, a nickel oxide thickness, roughness and porosity prevent glass from sticking to pure nickel metal. Glass, for example alkali aluminosilicate glass, sticks very strongly to unoxidized nickel metal. The roughness and porosity prevents bonding of nickel oxide to alkali aluminosilicate glass. If nickel oxide is polished to low roughness it sticks to glass. The porosity provides a sink for alkalis and other elements that out-diffuse and out-gas from glass at high temperature, so they do not accumulate on top of the mold surface and create a "sticky" glassy layer over time.

Second, the nickel oxide top layer can be loose and it acts as a lubricant in that some small amount of nickel oxide can release and attached to the glass surface preventing the glass from sticking to the mold. The released oxide layer is readily replenished by mold re-oxidizing during the forming cycle. The released nickel oxide appears as light haze on glass that is easily touch polished off.

The third reason for the decreased level of defects on the as formed glass-based surface with nickel is controlling the level of impurities and inclusions in the nickel. These impurities may include one or more of the following: Ti, Al, Zr, Si, Mn and Ce. These impurities are typically present in the Ni based alloys as oxides, sulfides and carbides. In many if not most cases the oxides, sulfides and carbides exist in the microstructure of the Ni alloy as a distinct phase, commonly called an inclusion, that is randomly distributed throughout the alloy. A certain percentage of these inclusions will end up on the machined and polished surface of the mold. During the glass forming process, these inclusions that are at or near the mold surface can be reactive with the glass and stick to it, or oxidize and react at a rate that is different from the bulk metal and thus form a protrusion on the mold surface. However, as noted above, in some embodiments the molds include a controlled amount of Ti, Al, Zr, Si, Mn and/or Ce to control the average grain size and/or average height differential between grain body areas and grain boundary areas to reduce the level of defects on the as formed glass-based surface after shaping resulting from grain boundaries. Thus, a balance is struck between including enough impurities, such as Ti, Al, Zr, Si, Mn and Ce, to achieve a desired average grain size and/or average height differential between grain body areas and grain boundary areas without add so much that too many inclusions are present on the molding surface.

In some embodiments, metal oxide layer 120 may have an average surface roughness ($R_a$) of less than or equal to about 1 micron on surface 124. In some embodiments, this average surface roughness ($R_a$) is determined over an evaluation length, such as 100 μm, 10 mm, 100 mm, etc. or may be determined based on an analysis of the entire surface 124 of nickel oxide layer 120. As used herein, $R_a$ is measured over a 260 μm×350 μm sized area and defined as the arithmetic average of the differences between the local surface heights and the average surface height and can be described by the following equation:

$$R_a = \frac{1}{n}\sum_{i=1}^{n}|y_i|,$$

where $y_i$ is the local surface height relative to the average surface height. In other embodiments $R_a$ may be less than or equal to about 1 μm, 0.9 μm, 0.8 μm, 0.7 μm, 0.6 μm, 0.5 μm, 0.4 μm, 0.35 μm 0.3 μm, 0.25 μm, 0.2 μm, 0.15 μm or 0.1 μm over an evaluation length of 10 mm. In some embodiments, $R_a$ may be in a range from about 0.1 μm to about 1 μm, about 0.1 μm to about 0.5 μm, about 0.1 μm to about 0.4 μm, about 0.1 μm to about 0.3 μm, 0.15 μm to about 1 μm, about 0.15 µm to about 0.5 µm, about 0.15 µm to about 0.4 µm, about 0.15 µm to about 0.3 µm, about 0.15 µm to about 0.25 µm, 0.2 µm to about 1 µm, about 0.2 µm to about 0.5 µm, about 0.2 µm to about 0.4 µm, or about 0.4 µm to about 1 µm over an evaluation length of 10 mm. The $R_a$ can be measured using a confocal microscope, such as one available from Zeiss, or an optical profilometer, such as one available from Zygo.

In some embodiments, metal oxide layer 120 may have a waviness, $W_a$, which describes the arithmetic average peak-to-valley height of the waviness surface profile of surface 124. In some embodiments, the $W_a$ is from about 1 nm to about 500 nm, about 1 nm to about 450 nm, about 1 nm to about 400 nm, about 1 nm to about 350 nm, about 1 nm to about 1 nm to about 300 nm, about 1 nm to about 250 nm, about 1 nm to about 200 nm, about 1 nm to about 150 nm, or about 1 nm to about 100 nm over an evaluation length of 1 cm. In some embodiments, the $W_a$ is less than or equal to about 500 nm, 450 nm, 400 nm, 350 nm, 300 nm, 250 nm, 200 nm, 150 nm, 100 nm, 80 nm, 60 nm, 40 nm, 20 nm, 10 nm, 5 nm, 2 nm over an evaluation length of 1 cm. The $W_a$ can be measured using a confocal microscope, such as one available from Zeiss, or an optical profilometer, such as one available from Zygo.

In some embodiments, the ratio of the $R_{volume}$ below the surface of the metal oxide layer divided by the $R_{volume}$ above the surface of the metal oxide layer is less than or equal to 2, less than or equal to 1.75, less than or equal to 1.5, less than or equal to 1.25 or less than or equal to 1. The $R_{volume}$ is the volume of the average surface roughness data specified by software as above or below a surface and can be measured using an optical profilometer, such as one available from Zygo. An $R_{volume}$ ratio greater than about 2 indicates that there is a predominance of valleys or low lying areas between grain boundaries that may lead to protruding grain boundaries transferring to a glass-based material as a defect during molding.

Embodiments of molds 110 described herein may be used in any forming processes, such as 3D glass forming processes. The molds 100 are especially useful in forming 3D glass articles when used in combination with the methods and devices described in U.S. Pat. Nos. 8,783,066 and 8,701,443, which are hereby incorporated by reference in their entireties. The issue of glass sticking to mold 110 during the forming process is known to increase with decreasing roughness and decreasing glass viscosity. The embodied nickel molds provide a novel means of addressing this sticking or adhesion issue and provide glass-based articles with little to no surface defects or flaws.

Molds 110 described herein may be utilized in making glass-based articles by forming a glass-based article by contacting a glass-based material with mold 110 at a temperature sufficient to allow for shaping of the glass-based material. In some embodiments, molds 110 may be used in the following process: a typical thermal reforming process involves heating the 2D glass-based sheet to a forming temperature, e.g., a temperature in a temperature range corresponding to a glass viscosity of $10^7$ Poise to $10^{11}$ Poise or between an annealing point and softening point of the glass, while the 2D glass-based sheet is on top of a mold 110. The heated 2D glass-based sheet may start sagging once heated. Typically, vacuum is then applied in between the glass-based sheet and mold 100 to conform the glass-based sheet to the surface 124 and thereby form the glass-based sheet into a 3D glass-based article. After forming the 3D glass-based article, the 3D glass-based article is cooled to a temperature below the strain point of the glass, which would allow handling of the 3D glass-based article.

The glass-based articles formed via the embodiments herein may be described by Publ. No. US 2013-0323444 A1. The three-dimensional (3D) glass-based articles can be used to cover an electronic device having a display, for example as part or all of the front, back, and or sides of the device. The 3D cover glass can protect the display while allowing viewing of and interaction with the display. If used as the front cover, the glass-based articles can have a front cover glass section for covering the front side of the electronic device, where the display is located, and one or more side cover glass sections for wrapping around the peripheral side of the electronic device. The front cover glass section can be made contiguous with the side cover glass section(s).

The preformed glass used to in the processes described herein typically starts as a two dimensional (2D) glass sheet. The 2D glass sheet may be made by a fusion or float process. In some embodiments, the 2D glass sheet is extracted from a pristine sheet of glass formed by a fusion process. The pristine nature of the glass may be preserved up until the glass is subjected to a strengthening process, such as an ion-exchange chemical strengthening process. Processes for forming 2D glass sheets are known in the art and high quality 2D glass sheets are described in, for example, U.S. Pat. Nos. 5,342,426, 6,502,423, 6,758,064, 7,409,839, 7,685,840, 7,770,414, and 8,210,001.

In one embodiment, the glass is made from an alkali aluminosilicate glass composition. An exemplary alkali aluminosilicate glass composition comprises from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. This alkali aluminosilicate glass is described in U.S. Pat. No. 8,158,543.

Another exemplary alkali-aluminosilicate glass composition comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO)≥0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in Pub. No. US 2013-0004758 A1, the contents of which are incorporated herein by reference in their entirety.

Other types of glass compositions besides those mentioned above and besides alkali-aluminosilicate glass composition may be used for the 3D cover glass. For example, alkali-aluminoborosilicate glass compositions may be used for the 3D cover glass. Preferably, the glass compositions used are ion-exchangeable glass compositions, which are generally glass compositions containing small alkali or alkaline-earth metals ions that can be exchanged for large alkali or alkaline-earth metal ions. Additional examples of ion-exchangeable glass compositions may be found in U.S.

Pat. Nos. 7,666,511; 4,483,700; 5,674,790; 8,969,226; 8,158,543; 8,802,581; and 8,586,492, and Pub. No. US 2012-0135226 A1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

It should now be understood that the molds disclosed herein may offer the advantage of reduced flaws on the surface of glass which is shaped by the herein disclosed molds. It should now also be understood that molds with superior surface characteristics may be produced by the methods described herein, particularly by utilizing the heating regimes disclosed herein to produce oxide layers on the shaping surfaces of the molds.

Example 1

Various properties of the outer metal oxide surface of two molds of differing composition were measured. Table 1 below shows the composition for each mold and Table 2 below shows various properties of the outer metal oxide surface. Mold 1 with higher impurity levels and smaller grain size had better performance. Large grain size can be related to higher nickel content (i.e., higher purity). Thus, glass molded using mold 1 had fewer defects than glass molded using mold 2, primarily because of the difference in grain size, surface roughness $R_a$, and waviness $W_a$.

TABLE 1

| Metal (wt %) | Mold 1 | Mold 2 |
| --- | --- | --- |
| Ni | 99.36 | 99.44 |
| Mn | 0.25 | 0.25 |
| Fe | — | 0.04 |
| Zn | 0.05 | — |
| Cr | 0.04 | 0.07 |
| Ti | 0.10 | 0.15 |
| Si | 0.20 | 0.05 |

TABLE 2

| Property | Mold 1 | Mold 2 |
| --- | --- | --- |
| Average Surface Roughness Ra (μm) over a 0.35 mm × 0.26 mm area | 0.196 | 0.117 |
| Waviness $W_a$ (μm) over a 19.84 mm × 14.88 mm area | 0.328 | 0.631 |
| Waviness (nm/mm$^2$) obtained by dividing $W_a$ in nm by product of 19.84 mm × 14.88 mm | 1.11 | 2.14 |
| Rvolume (μm$^3$) below average surface roughness | 0.183 | 0.190 |
| Rvolume (μm$^3$) above average surface roughness | 0.114 | 0.086 |
| Grain size (μm) | 38.5 | 419.3 |

Example 2

Figure 5:
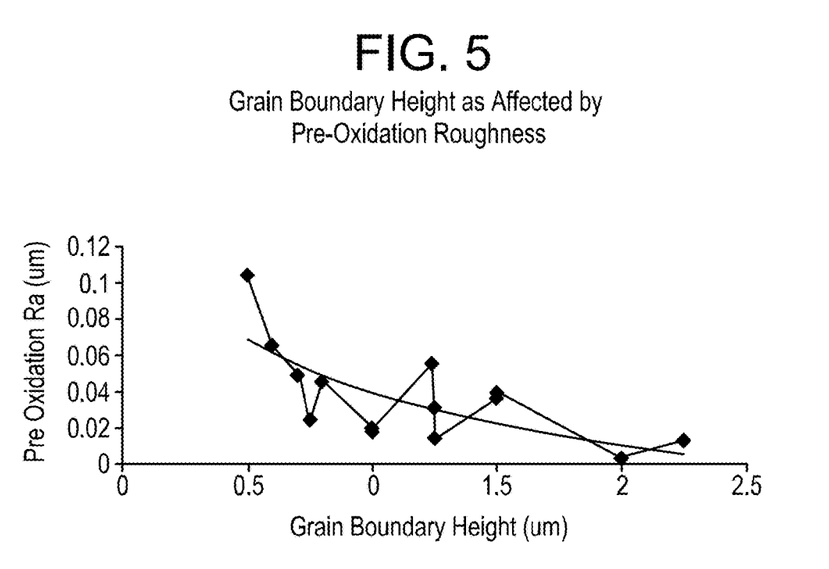
FIG. 5 is a plot showing the affect of the pre-oxidation average surface roughness ($R_a$) on the grain boundary height.

The surface roughness $R_a$ of fourteen nickel molds having the same composition were measured prior to oxidizing the surface of the molds. Each mold was then subjected to the same oxidation process of heating from room temperature to 800° C. at a rate of 100° C./hr and then holding the molds at 800° C. for 16 hours. After the oxidation process, the maximum grain boundary height was measured. FIG. 5 shows a plot of the pre-oxidation surface roughness $R_a$ in μm vs. the maximum grain boundary height in μm of the mold surface after oxidation. As can be seen by the fitted line in FIG. 5, decreasing the pre-oxidation surface roughness generally increases the grain boundary height. As discussed above, minimizing the grain boundary height can improve the surface texture quality of the mold, thereby preventing or minimizing defects transferring to the glass-based material during molding.

Example 3

Two nickel molds having the same composition with 0.21% by weight manganese were polished to the surface roughnesses $R_a$ listed in Table 3 prior to oxidation. Both molds were subjected to an oxidation treatment of heating the mold at 900° C. for 1.5 hours. After the oxidation process, the surface roughness $R_a$ and waviness $W_a$ were measured. Table 3 lists the measurements for the two molds.

TABLE 3

| | Mold | |
| --- | --- | --- |
| | 1 | 2 |
| Pre-oxidation surface roughness $R_a$ (μm) | 0.02 | 0.1 |
| Pre-oxidation surface finish | mirror | matte |
| Post-oxidation surface roughness $R_a$ (μm) | 0.143 | 0.172 |
| Post-oxidation waviness $W_a$ (μm) | 0.125 | 0.075 |

Figure 6A:
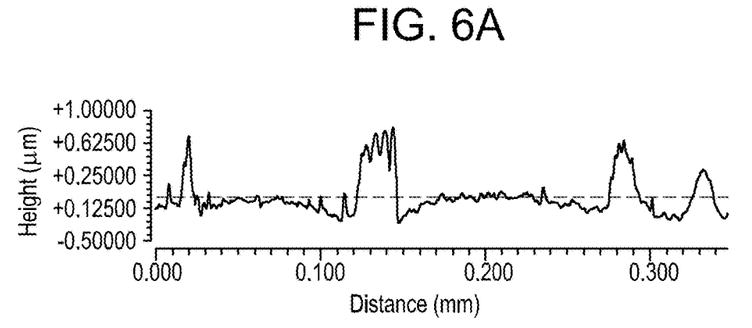
FIG. 6A is a profile plot of an exemplary mold surface post-oxidation that had a mirror finish before oxidation showing the height of the grain boundaries on the y axis and the distance between the grain boundaries along the width of the sample on the x axis.
Figure 6B:
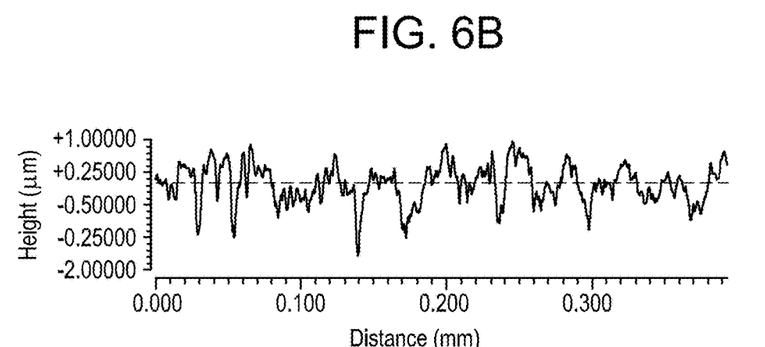
FIG. 6B is a profile plot of an exemplary mold surface post-oxidation that had a matte finish before oxidation showing the height of the grain boundaries on the y axis and the distance between the grain boundaries along the width of the sample on the x axis

As can be seen from the data in Table 3, mold 1 having the mirror finish and the lower surface roughness pre-oxidation, had the lower surface roughness and higher waviness post-oxidation and mold 2 having the matte finish and higher surface roughness pre-oxidation, had the higher surface roughness and lower waviness post-oxidation. Mold 1 had an undesirable surface texture with large grains with distinctive grain boundaries as shown by the spikes in FIG. 6A, which is profile plot showing the height of the grain boundaries on the y axis and the distance between the grain boundaries along the width of the sample on the x axis. Mold 2 had a desirable surface texture with small grains with indistinct grain boundaries as shown in the absence of distinct spikes in FIG. 6B. Thus a mold having a pre-oxidation surface having a matte finish had better surface texture than a mold having pre-oxidation surface having a mirror finish (e.g., an average surface roughness ($R_a$) of less than about 0.03 μm) upon oxidation of the mold.

Example 4

Figure 7A:
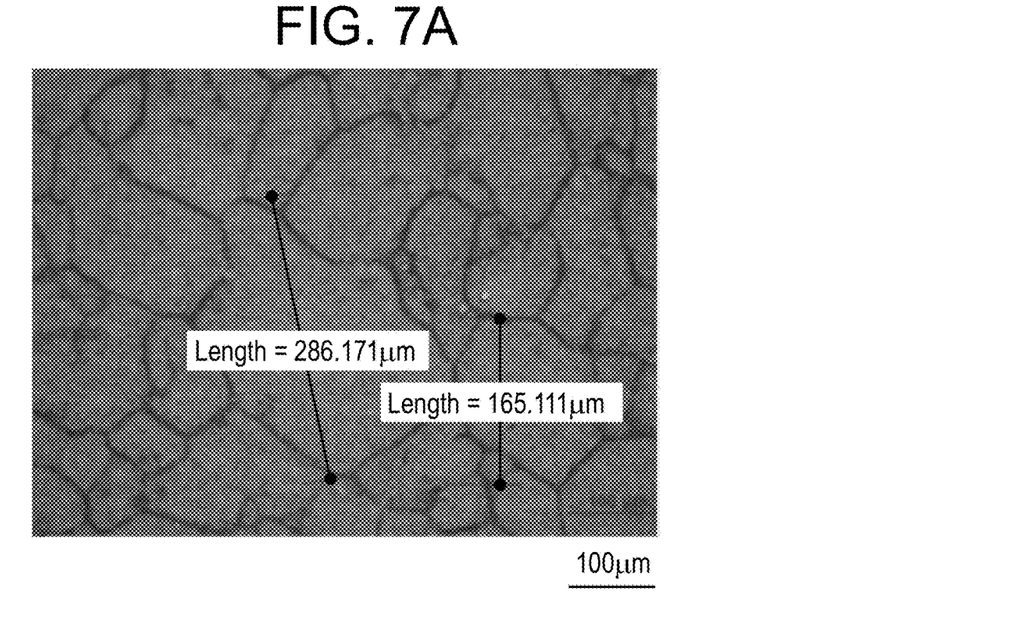
FIG. 7A is an image showing the grain size of a mold polished using a linear motion.
Figure 7B:
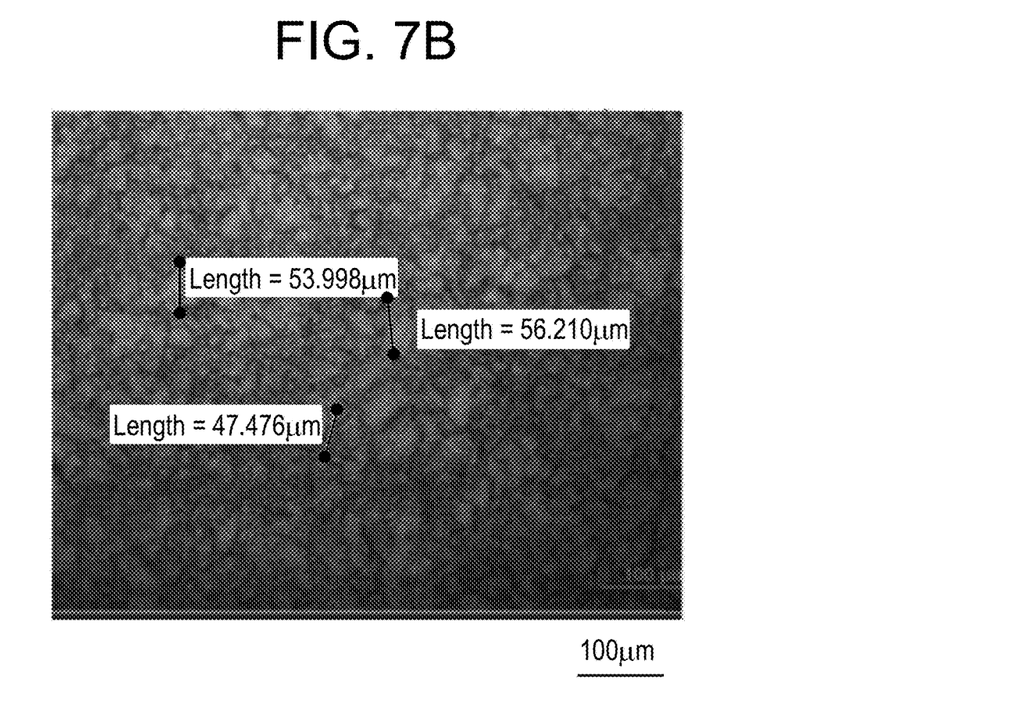
FIG. 7B is an image showing the grain size of a mold polished using a circular motion.

Three nickel molds were polished pre-oxidation. The first mold was polished using a linear motion to a surface roughness $R_a$ of about 0.02 μm; the second mold polished using a linear motion to a surface roughness $R_a$ of about 0.1 μm; and the third mold was polished using a circular motion to a surface roughness $R_a$ of about 0.1 μm. The three mold surfaces were subjected to an oxidation treatment of heating from room temperature to 800° C. at a rate of 100° C./hr and then holding the molds at 800° C. for 16 hours. The two molds that were polished using a linear motion had an undesirable surface texture with large distinct grains, as shown in FIG. 7A, and the mold polished with the circular motion had a desirable surface texture with small indistinct grains, as shown in FIG. 7B. As discussed above, grinding, lapping, and/or polishing a mold surface with a random motion, such as a circular motion, rather than a linear motion results in a mold with better surface texture.

Example 5

Figure 8A:
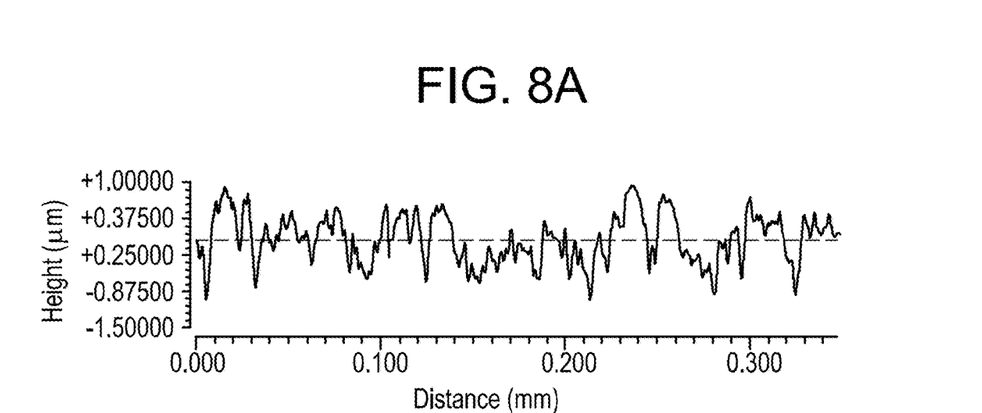
FIG. 8A is a profile plot of an exemplary mold surface post-oxidation that was doped with aluminum before oxidation showing the height of the grain boundaries on the y axis and the distance between the grain boundaries along the width of the sample on the x axis.
Figure 8B:
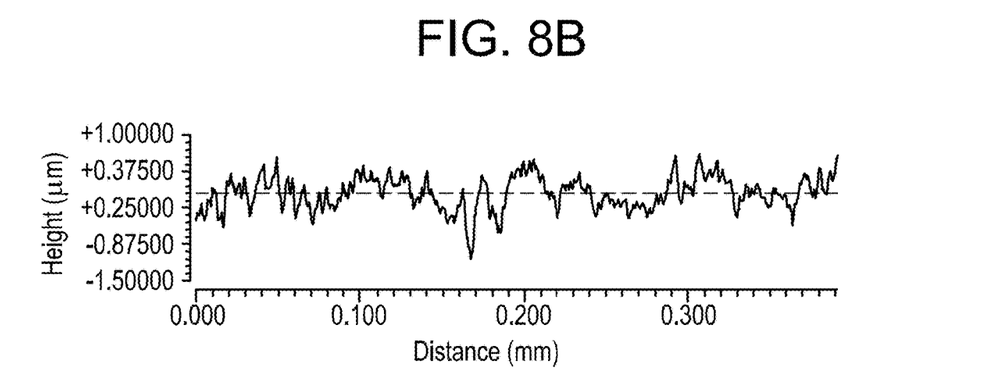
FIG. 8B is a profile plot of an exemplary mold surface post-oxidation that was doped with manganese before oxidation showing the height of the grain boundaries on the y axis and the distance between the grain boundaries along the width of the sample on the x axis.
Figure 8C:
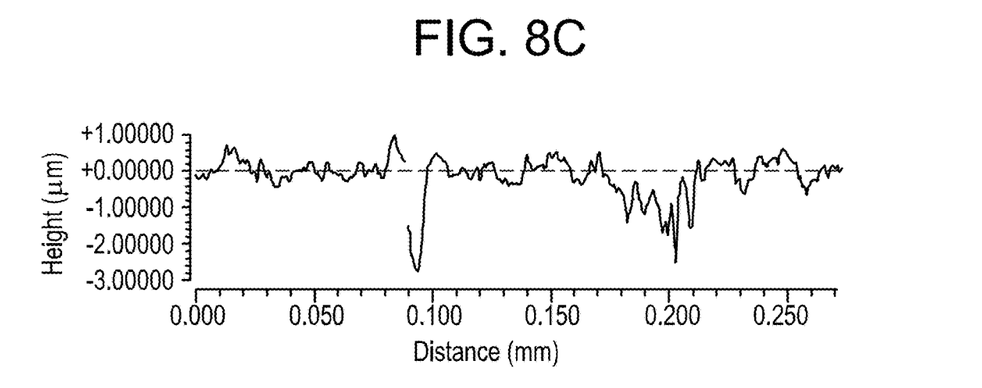
FIG. 8C is a profile plot of an exemplary mold surface post-oxidation that was doped with cerium before oxidation showing the height of the grain boundaries on the y axis and the distance between the grain boundaries along the width of the sample on the x axis.

Three nickel molds were doped with aluminum, manganese, or cerium by washing the mold surface with an atomized solution one with a solution of 1 mg of aluminum oxide to 1 ml of deionized water, one with a solution of 1 mg manganese carbonate to 1 ml of deionized water salt solution, one with a solution of 1 g cerium ammonium nitrate to 25 ml of deionized water. The molds were subjected to an oxidation treatment (while the solutions were on the mold) of heating from room temperature to 800° C. at a rate of 100° C./hr and then holding the molds at 800° C. for 16 hours. FIGS. 8A-8C show a profile plot of the height of the grain boundaries on the y axis and the distance between the grain boundaries along the width of the sample on the x axis for the aluminum, manganese, and cerium solutions, respectively. As can be seen, doping decreased the grain size and distinctiveness of the grain boundaries. For the cerium ammonium nitrate solution (8C), the orientation of the grain boundary growth was reversed such that there are no raised grain boundaries.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

We claim:

1. A mold comprising:
    a mold body having a metal surface; and
    a metal oxide layer on the metal surface of the mold body, wherein:
        the metal oxide layer has first and second opposing surfaces,
        the first surface of the metal oxide layer contacts and faces the metal surface of the mold body,
        the second surface of the metal oxide layer includes a plurality of grains, and
        the plurality of grains has an average grain size of about 300 µm or less.
2. The mold of claim 1, wherein the second surface includes at least one grain body area and at least one grain boundary area and wherein an average height differential between the at least one grain body area and the at least one grain boundary area is about 2 µm or less.
3. The mold of claim 2, wherein the average height differential is about 1 µm or less.
4. The mold of claim 1, wherein the average grain size is about 150 µm or less.
5. The mold of claim 1, wherein the second surface of the metal oxide layer has a waviness (Wa) of less than or equal to about 500 nm.
6. The mold of claim 5, wherein the second surface of the metal oxide layer has a waviness (Wa) of less than or equal to about 100 nm.
7. The mold of claim 1, wherein the second surface of the metal oxide layer has an average surface roughness (Ra) of about 1 µm or less.
8. The mold of claim 7, wherein the second surface of the metal oxide layer has an average surface roughness (Ra) of about 0.4 µm or less.
9. The mold of claim 8, wherein the second surface of the metal oxide layer has an average surface roughness (Ra) in a range from about 0.2 µm to about 0.4 µm.
10. The mold of claim 1, wherein the second surface of the metal oxide layer has a waviness (Wa) of less than or equal to about 500 nm and an average surface roughness (Ra) of about 1 µm or less.
11. The mold of claim 1, wherein the second surface of the metal oxide layer has a waviness (Wa) of less than or equal to about 500 nm and an average surface roughness (Ra) in a range from about 0.2 µm to about 0.4 µm.
12. The mold of claim 1, wherein a ratio of an $R_{volume}$ below the surface of the metal oxide layer divided by the $R_{volume}$ above the surface of the metal oxide layer is less than or equal to 2.
13. The mold of claim 1, wherein the mold body comprises:
    at least 90% nickel by weight; and
    at least one of titanium, aluminum, zirconium, silicon, manganese, or cerium, wherein a sum of a weight percent of titanium, aluminum, zirconium, silicon, manganese and cerium is in a range from about 0.6% to about 1%.
14. The mold of claim 13, wherein the mold body comprises at least 99% nickel by weight.
15. The mold of claim 13, wherein the metal oxide layer is nickel oxide.

* * * * *

UNITED STATES PATENT AND TRADEMARK OFFICE
CERTIFICATE OF CORRECTION

PATENT NO. : 10,351,459 B2
APPLICATION NO. : 15/234114
DATED : July 16, 2019
INVENTOR(S) : Yi-Chun Chiang et al.

Page 1 of 1

It is certified that error appears in the above-identified patent and that said Letters Patent is hereby corrected as shown below:

On the Title Page

On page 2, Column 2, item (56), other publications, Line 22, delete "Decarburiza ion" and insert -- Decarburization --, therefor.

Signed and Sealed this
Seventh Day of January, 2020

Andrei Iancu
*Director of the United States Patent and Trademark Office*